United States Patent [19]

Kelly et al.

[11] Patent Number: 5,210,850
[45] Date of Patent: May 11, 1993

[54] MEMORY ADDRESS SPACE DETERMINATION USING PROGRAMMABLE LIMIT REGISTERS WITH SINGLE-ENDED COMPARATORS

[75] Inventors: Philip C. Kelly, Houston; Michael J. Collins, Tomball, both of Tex.

[73] Assignee: Compaq Computer Corporation, Houston, Tex.

[21] Appl. No.: 538,724

[22] Filed: Jun. 15, 1990

[51] Int. Cl.[5] .............................. G06F 12/14
[52] U.S. Cl. .................. 395/425; 361/DIG. 1; 361/DIG. 7; 361/969.1
[58] Field of Search ... 364/200 MS File, 900 MS File, 364/246.7, 969.1; 395/425, 400; 371/19

[56] References Cited

U.S. PATENT DOCUMENTS

| | | | |
|---|---|---|---|
| 4,407,016 | 9/1983 | Bayliss et al. | 364/200 |
| 4,503,491 | 3/1985 | Lushtak et al. | 364/200 |
| 4,527,237 | 7/1985 | Frieder et al. | 364/200 |
| 4,682,283 | 7/1987 | Robb | 364/200 |
| 4,860,192 | 8/1989 | Sachs et al. | 364/200 |

FOREIGN PATENT DOCUMENTS 0309995  4/1989  European Pat. Off. .
63-234336  9/1988  Japan .

OTHER PUBLICATIONS

W. H. Payne, "Decode overlapped EPROM, RAM, and I/O", 2119 E.D.N. Electrical Design News 32 (1987) May 14, No. 10, p. 241.

Primary Examiner—Joseph L. Dixon
Assistant Examiner—Rebecca L. Rudolph
Attorney, Agent, or Firm—Pravel, Gambrell, Hewitt, Kimball & Krieger

[57] ABSTRACT

An apparatus for determining cacheable address and write-protect memory address regions in a computer system which includes a programmable single-ended limit register and a single comparator to determine each such region. A programmable limit register associated with each respective memory address region defines a boundary limit for each of the respective memory regions. A single address comparator associated with each respective limit register determines whether a memory address developed by the computer system resides between the respective boundaries provided by the value stored in the respective programmable limit register and a predefined address. The use of a single limit register and a single address comparator for each memory address region reduces the gate count and decreases the input buffer loading in the logic circuitry.

13 Claims, 7 Drawing Sheets

MEMORY ADDRESS SPACE DETERMINATION USING PROGRAMMABLE LIMIT REGISTERS WITH SINGLE-ENDED COMPARATORS

BACKGROUND OF THE INVENTION

1. Field of the Invention

The present invention relates to microprocessor caches in computer systems, and more specifically to a method for determining cacheable address and write protect memory address regions in a computer system using a preset memory address value and a programmable single ended limit register to provide the respective memory address boundaries for each respective memory address region.

2. Description of the Prior Art

The personal computer industry is a vibrant and growing field that continues to evolve as new innovations occur. The driving force behind this innovation has been the increasing demand for faster and more powerful computers. A major bottleneck in personal computer speed has historically been the speed with which data can be accessed from memory, referred to as the memory access time. The microprocessor, with its relatively fast processor cycle times, has generally had to wait during memory accesses to account for the relatively slow memory access times. Therefore, improvement in memory access times has been one of the major areas of research in enhancing computer performance.

In order to bridge the gap between fast processor cycle times and slow memory access times, cache memory was developed. A cache is a small amount of very fast, expensive, zero wait state memory that is used to store a copy of frequently accessed code and data from system memory. The microprocessor can operate out of this very fast memory and thereby reduce the number of wait states that must be interposed during memory accesses. When the processor requests data from memory and the data resides in the cache, then a cache read hit occurs, and the data from the memory access can be returned to the processor from the cache without incurring wait states. If the data is not in the cache, then a cache read miss occurs, and the memory request is forwarded to the system memory. The data is then retrieved from system memory as would normally be done if the cache did not exist.

The management or control of a cache is generally performed by a device referred to as a cache controller. The cache controller is principally responsible for keeping track of the contents of the cache as well as controlling data movement into and out of the cache. One responsibility of the cache controller is the preservation of cache coherency, which refers to the requirement that the copy of main memory held in the cache be identical to the data held in main memory. The cache controller is also generally responsible for the determination of which main memory addresses are capable of residing in the cache, referred to as cacheable addresses.

Microprocessor caches are generally able to cache most of the memory addresses in main memory. However, some memory addresses are defined as non-cacheable, or incapable of residing in the cache, because of cache coherency reasons. One example of memory that is generally designated as non-cacheable is memory that is dual ported or capable of being accessed by different ports. Dual ported memory is generally defined as being non-cacheable because of the cache coherency problems that are associated with this type of memory. The cache coherency problem arises because the cache controller is unable to snoop the memory access by a local master because the local master accesses the memory location from a different port than would the processor, and the cache controller does not have access to this port for snooping purposes. An example of dual ported memory that exists in personal computer systems is the memory located on a local area network (LAN) card. The LAN card memory is accessible by both the microprocessor and the cache controller via one port located on one side of the LAN memory and by a local processor on the LAN card via a different port located on the other side of the LAN memory. Cache coherency problems arise because the cache controller is unable to snoop local processor accesses to the LAN memory. Other examples of non-cacheable memory are memory that is mapped for input/output (I/O) devices and also bank switched or expanded memory.

The cache controller is generally charged with the duty of determining which main memory addresses are designated as cacheable and which main memory addresses are designated as non-cacheable. Conventionally, this has been done with a fixed address decode using programmable array logic (PAL) devices. A variation is to place a random access memory (RAM) on the address lines, with the data in the RAM being the cacheable status of the address block. Another variation is to use a series of pairs of limit registers which define the boundaries of cacheable and non-cacheable address regions. Each pair of limit registers stores memory address values that define the upper and lower boundaries of the address region. A comparator is generally associated with each stored memory address value to determine if the memory address generated by the computer system is between the respective upper or lower boundary address values defining a memory address region. If the generated memory address resides between the upper and lower address boundaries defining the address region, then the generated memory address is deemed cacheable or non-cacheable depending on the function of the respective limit registers.

This method of cacheable address determination generally includes a large amount of logic circuitry because two limit registers for storing of the upper and lower address boundaries and a comparator for each limit register are required for each cacheable or non-cacheable address region, and there are generally several such regions in the memory space of a computer system. The large amount of logic circuitry required for each respective cacheable address region limits the number of cacheable address regions that can be provided in the memory space of the computer system, thereby limiting the amount of cacheable main memory and consequently reducing the effectiveness of the cache memory.

Some background on the memory organization of personal computers compatible with those previously manufactured and sold by International Business Machines Corporation (IBM) is deemed appropriate. IBM's first personal computer, the IBM PC, included 20 address lines and therefore could only address one Mbyte of memory space. This one Mbyte memory space was located between memory address 00000H and memory address FFFFFH and was divided as follows. The lower 640 kbytes were designated for user memory, which was generally reserved for the operating system, a user's programs and associated data. The next 128 kbytes of memory was set aside for use by the video section of the computer system to store the video data that is displayed on the video monitor and the video ROM routines that are required for the operation of the video monitor. The video ROM routines comprise a set of programs that provide essential support for the operation of the video section, and these programs act as an interface between application software written for the computer system and the video hardware, which operates to display desired images on the video monitor.

The next 192 kbytes of memory after the video display memory area were originally referred to as the option ROM space. This memory area originally had no real assignment, but has been used for a variety of purposes that have arisen in the evolving history of IBM-compatible computers. The last 64 Kbytes in the 1 Mbyte memory space of the original IBM PC was used to hold the computer's built in system ROM programs. The system ROM holds a key set of programs that provide essential support for the operation of the computer, including the POST programs that make sure the computer is in good working order at power on and the routines referred to as the basic input-output system or BIOS. The BIOS programs provide detailed and intimate control of the various parts of the computer, particularly the input/output (I/O) peripherals, and in general act as an interface between the computer's hardware and the software written for the computer.

One of the uses that has been found for the 192 kbyte option ROM area discussed above has been as a growth area for the system ROM routines, which originally occupied only the last 64 Kbytes of the one Mbyte address space. When new equipment or devices are added to the computer which require built-in software support, the additional system ROM programs required for these new devices are generally located in the option ROM area. Another use for the option ROM area has been for extra video display memory or video RAM that is required by video display adapter cards based on new video standards. Additionally, many new functions or options have been developed which need RAM and ROM space, and this RAM and ROM is generally located in this area.

The IBM PC family has been developed around a family of microprocessors manufactured by Intel Corporation (Intel), referred to as the 8088 family of microprocessors. The original members of the IBM PC family were limited to addressing only one Mbyte of memory due to the fundamental design of the 8088 microprocessor on which they were based, which included only 20 address lines. Intel later introduced the 80286 microprocessor, which included 24 address lines and could directly address up to 16 Mbytes of physical memory. The addition of the 80286 microprocessor to a computer system allows for a logical address space of 16 Mbytes. However, the original design of the IBM PC and its DOS operating system were limited to the use of the original one Mbyte of memory, and they were generally unable to use the additional address space provided by the 80286 microprocessor.

In order to take advantage of the additional memory space provided by the 80286 microprocessor, IBM-compatible computer systems have developed what is called extended memory, which is the memory address space above the original one Mbyte address space located from memory address 100000H on up. The amount of extended memory available in a computer system generally depends on the amount of physical memory resident in the computer system greater than the original one Mbyte of memory discussed above. This additional memory can generally reside anywhere in the processor's logical address space between memory address 100000H and memory address FFFFFFH, which is the 16 Mbyte limit associated with the 80286 microprocessor. In order for an application program to take advantage of some of this special extended memory, the program used some of the services provided by the computer's system ROM programs. One of these system ROM services transferred blocks of data in whatever size needed between the special extended memory and the conventional one Mbyte memory.

Another feature that is generally included in IBM-compatible personal computers is a ROM relocation feature. The system ROM and video ROM memory which reside in the one conventional Mbyte memory address space discussed above are generally much slower than the high-speed RAM which comprises the remainder of system memory. Therefore, in order to improve system performance during execution of the BIOS routines which reside in the system ROM and video ROM, many computer systems include a ROM relocation feature which allows the system ROM and/or video ROM to be relocated or copied to high-speed RAM. In computer systems using the 80286 microprocessor, the ROM is generally copied to the upper 128 kbyte RAM memory area just below 16 Mbytes, which is reserved for this purpose. When so copied, this 128 kbyte RAM location, referred to as shadow RAM, becomes dual mapped or accessible to two sets of logical addresses: its original RAM memory addresses and the ROM memory addresses of the ROM memory that has been relocated to this location.

The shadow RAM can be designated as write protected to ensure that the data cannot accidentally change and effectively remains a ROM. The shadow RAM may also be designated as cacheable memory to further improve system performance during execution of the system ROM routines. If the shadow RAM is designated as cacheable memory, it is also generally designated as write-protected inside the cache controller to ensure that ROM memory data which is placed in the cache retains its read-only status inside the cache. The cache controller therefore generally requires a means to determine whether a memory address generated by the computer system has been designated as write protected. This has generally been accomplished in the same manner as has the determination of cacheable address regions in the cache. The standard method was a fixed mapping, and as an alternative, two registers can be associated with a write protect memory address region to define the respective upper and lower memory address boundaries of the write protect region.

The system ROM includes a series of test and initializations programs referred to as the Power-On Self-Test (POST), which the computer performs at power on to ensure that the computer is in good working order. When the computer is reset or turned on, the microprocessor is directed to a reset vector location in high memory at memory address FFFFF0H to retrieve the correct memory location at which to begin the POST. Memory address FFFFF0H is interpreted by the memory controller during a system reset or power on of the computer system to access the ROM location where a power on reset vector is located. The power on reset vector points to the appropriate memory location where the POST programs begin. It is generally desirable that the high memory location where the power on reset vector is addressed be designated non-cacheable in order to prevent the reset vector from being placed in the cache. If the reset vector were located in the cache when a system reset was initiated, the microprocessor would attempt to retrieve the reset vector from the cache and therefore could receive an incorrect vector, resulting in a "crash" of the computer system.

SUMMARY OF THE INVENTION

The present invention includes an apparatus which allows a cache controller to determine cacheable address and write protect memory address regions in a computer system using a single programmable limit register and a single comparator for each address region. The computer system memory space is partitioned into cacheable and write protect address regions with a programmable limit register storing a memory address defining one boundary for each of the respective memory regions. A single address comparator associated with each respective limit register determines whether a memory address generated by the computer system resides between the boundary provided by the limit register and another predefined memory address boundary that may either be a natural boundary such as the lowest and highest memory address available in the computer system, memory address 00000H and memory address FFFFFH, respectively, or a memory address boundary formed by an inhibit signal provided to the comparator circuitry. Each of the address comparators associated with the respective limit registers generates a signal which is provided to signal generation circuitry inside the cache controller which generates a cacheable address signal, a non-cacheable address signal and a write protect signal that are provided to the cache controller. The use of a single limit register and a single address comparator for each respective memory address region reduces the gate count in the logic circuitry and decreases the input buffer loading in the logic circuitry. In addition, the programmability of the limit registers introduces flexibility in the designation of cacheable address and write protect memory regions in the cache controller.

The preferred embodiment of the present invention includes five limit registers defining four cacheable address regions and two write protect memory regions. The comparator circuitry associated with three of the limit registers according to the present invention use the lowest and highest memory address available in the computer system, memory address 00000H and memory address FFFFFH, respectively, as boundaries for a respective address region. These low or high address are used in conjunction with the boundary provided by the respective limit register to define the memory region. The associated comparator circuitry for these limit registers determines whether the address generated by the computer system is below or above, respectively, the memory address stored in the respective limit register. The comparator circuitry associated with the remaining two limit registers use an inhibit signal that is asserted when the memory address generated by the computer system is above or below one Mbyte, respectively, and therefore one Mbyte serves as the predefined boundary in the comparator circuitry associated with these two limit registers. The comparator circuitry associated with these two limit registers determines if the address generated by the computer system is below or above, respectively, the memory address stored in the respective limit register, and the inhibit signal serves as the other respective boundary by inhibiting comparator operation if active.

The present invention includes a control signal which enables the comparator output signals in the signal generation circuitry to define cacheable address and write protect regions in the memory space according to the present invention. When this control signal is cleared, the comparator output signals provided to the signal generation circuitry are ignored, and the entire memory address space is considered cacheable, and, in addition, there are no write protected memory regions defined in the cache controller. An input to the signal generation circuitry in the cache controller is provided to allow external logic to define non-cacheable and write protect address regions in the memory space. When the control signal is set, the entire memory address map is considered non-cacheable, and the comparator output signals are enabled in the signal generation circuitry to define cacheable address and write protect memory regions in the memory space according to the memory address boundaries stored in the associated limit registers.

When the control signal is set, the cacheable address and write protect memory spaces defined by the programmable limit registers are deemed to be continuous from the predefined memory address boundary to the other boundary provided by the address value stored in the limit register, and therefore excluded regions within the address limits are not permitted. However, the above-mentioned input functions to allow external logic to override any internally programmed limit register and punch non-cacheable or write protect regions into the memory address space where required. The input is used according to the preferred embodiment of the present invention to make non-cacheable the region located in high memory where the power on reset vector is addressed during a system reset or at power on of the computer system. This memory region is made non-cacheable to prevent any corruption of the reset vector that would occur if the reset vector were located in the cache during a system reset.

BRIEF DESCRIPTION OF THE DRAWINGS

A better understanding of the invention can be obtained when the following detailed description of the preferred embodiment is considered in conjunction with the following in which.

DETAILED DESCRIPTION OF THE PREFERRED EMBODIMENT

Figure 1:
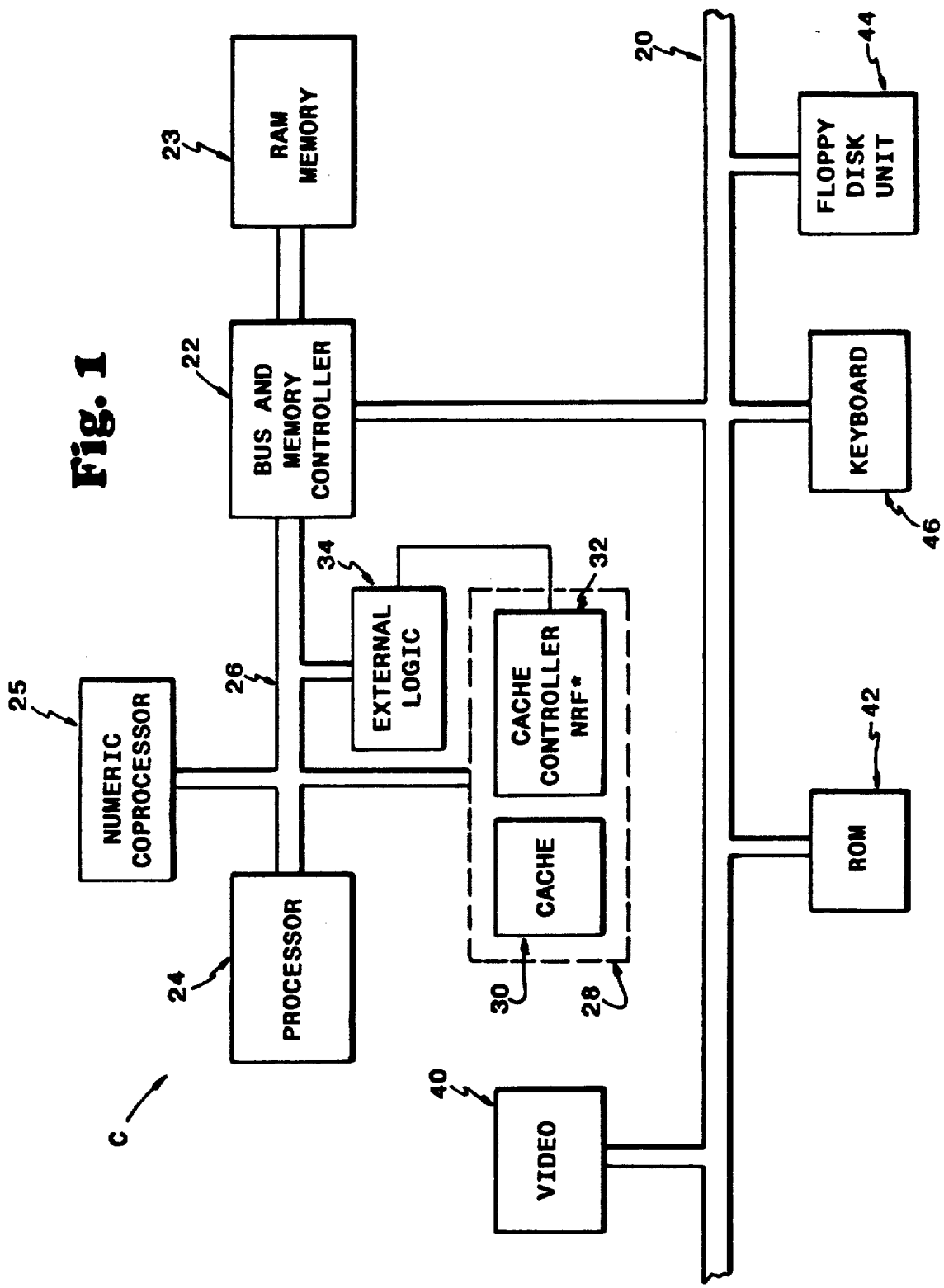
FIG. 1 is a block diagram of a computer system including limit registers and associated logic circuitry according to the present invention.

Referring now to FIG. 1, a personal computer system C incorporating the present invention is generally shown. Many of the details of a computer system that are not relevant to the present invention have been omitted for the purpose of clarity. In the description that follows, a signal name followed by an asterisk indicates that the signal is asserted when it has a low logic level. The computer system C includes a system bus 20 that is preferably based on the Industry Standard Architecture (ISA), a bus architecture introduced in the International Business Machines (IBM) PC/AT personal computer. A controller chip 22 comprising a bus controller and a memory controller is connected to the system bus 20. Random access memory 23, which is preferably 16-bit high speed RAM, is connected to the controller chip 22. The controller chip 22 is connected to a microprocessor 24 through a local processor bus 26, which includes address, data, and control portions. The microprocessor 24 is preferably an Intel 80386SX microprocessor, which includes 24 address lines and is capable of directly accessing 16 Mbytes of memory. However, the use of other processors with different capabilities for accessing memory is also contemplated. The processor address portion of the local bus 26 preferably includes 24 address lines referred to as PA-DR<23...0>, and the processor data portion of the local bus 26 preferably includes 16 data lines referred to as PDB<15...0>. A cache memory chip 28, which preferably includes cache memory 30 and a cache controller 32 according to the present invention, is coupled to the processor bus 26. The cache controller 32 includes programmable limit registers and their associated comparator logic circuitry as well as signal generation circuitry which generates a cacheable address signal, a non-cacheable address signal, and a write protect signal which are provided to the cache controller according to the present invention. The signal generation circuitry in the cache controller 32 according to the present invention includes an input referred to as NRF*, which receives a signal generated by external logic 34 according to the present invention. A numeric coprocessor 25 may optionally be connected to the local bus 26.

Any computer system memory not physically located in the random access memory 23 is preferably located on the system bus 20. A video display adapter 40, which includes video RAM and video ROM memory addressable by the processor 24, is coupled to the system bus 20. System ROM 42, which preferably includes the system ROM routines, is also coupled to the system bus 20. A floppy disk unit 44 and a keyboard 46 may also be attached to the system bus 20. The contents of the video ROM and system ROM 42 are preferably copied into the upper 128 kbyte logical address block of the RAM 23 just below 16 Mbytes immediately after power on of the computer system C, as is described further below.

Figure 2:
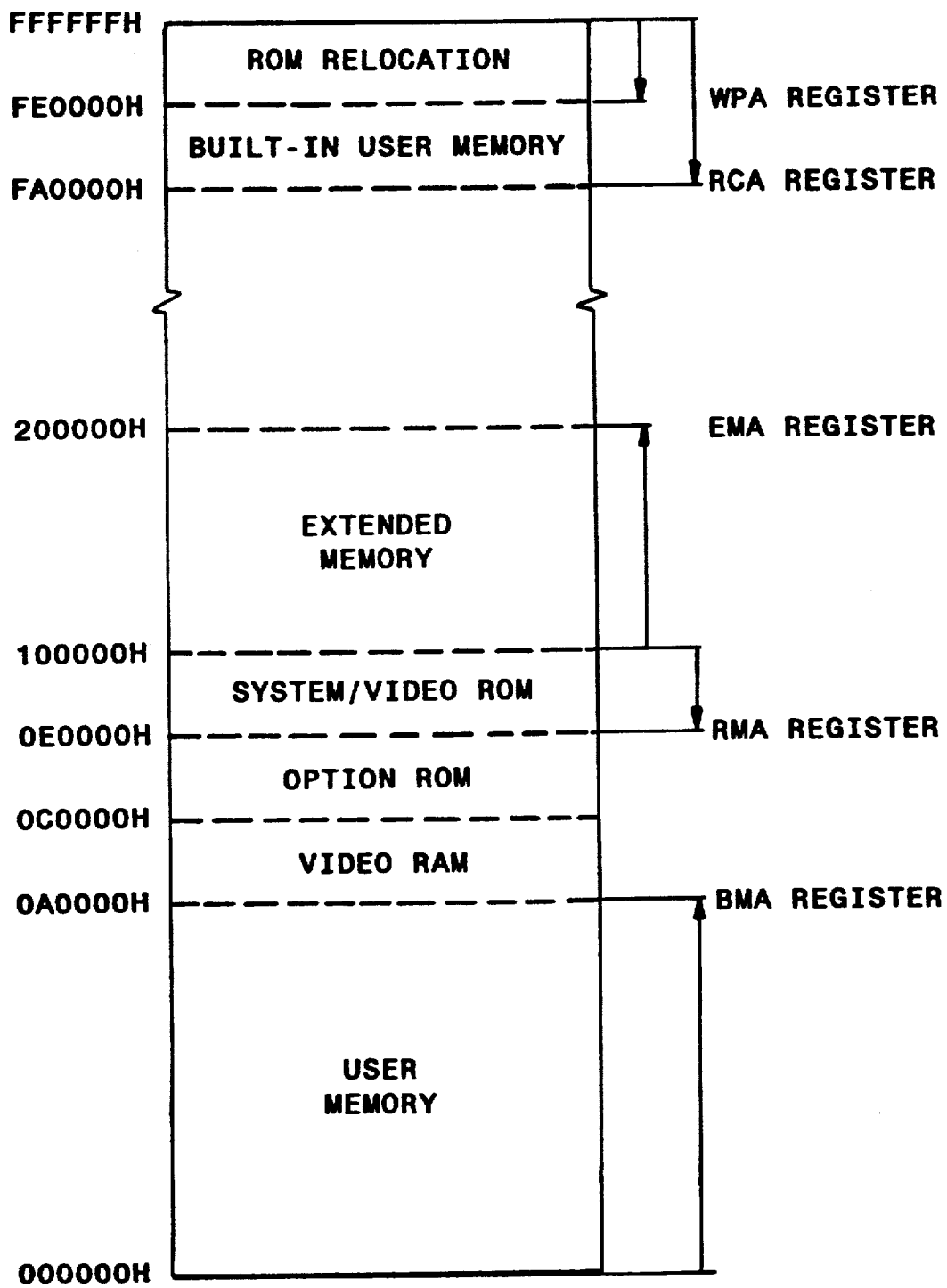
FIG. 2 is a diagram of the memory address space of the computer system of FIG. 1.

Referring now to FIG. 2, a memory map showing the memory organization of the computer system C is generally shown. The memory organization of the computer system C is preferably compatible with the memory organization of personal computers previously manufactured and sold by IBM. However, the incorporation of the present invention into computer systems with other memory organizations is also contemplated. The 640 kbyte memory space from memory address 000000H to memory address 09FFFFH is reserved for the operating system and user memory. The next 128 kbyte block of memory from memory address 0A0000H to memory address 0BFFFFH is reserved for the video RAM. The next 128 kbyte block of memory from memory address 0C0000H to memory address 0DFFFFH is reserved for the option ROM and RAM associated with the various I/O peripherals included in the computer system C. The next 128 kbyte memory region from memory address 0E0000H to memory address 0FFFFFH is reserved for the system ROM 42 and the video ROM of the computer system C. The system ROM 42 and the video ROM each preferably comprise 64 kbytes of this 128 kbyte memory space according to the preferred embodiment.

The computer system C preferably includes two Mbytes of random access memory. 640 kbytes are located in the user memory area between memory address 000000H and memory address 0A0000H, as noted above. 384 kbytes are preferably mapped to the logical address space in high memory between memory address FA0000H and memory address FFFFFFH. The upper 128 kbyte space between memory address FE0000H and memory address FFFFFFH is preferably used to relocate the 64 kbyte system ROM 42 and the 64 kbyte video ROM from the slower 16 bit ROM memory into the higher speed 16 bit RAM. However, the use of a different RAM memory region to relocate the system ROM 42 and/or video ROM is also contemplated. The remaining 256 kbytes of the high mapped 384 kbytes are preferably mapped to the logical address space between memory address FA0000H and memory address FE0000H according to the preferred embodiment, and this memory is designated as built-in user memory. The memory address space beginning with memory address 100000H is referred to as the extended memory address space, and the amount of extended memory present in the computer system C depends on the amount of physical memory installed in the computer system C greater than the one Mbyte of memory discussed above. In one embodiment of the present invention, the remaining one Mbyte is preferably mapped to the memory address space between memory address 100000H and memory address 1FFFFFH according to the preferred embodiment as extended memory.

The present invention includes five programmable limit registers that are each used to store a memory address value which serves as a boundary that, in conjunction with a respective predefined memory address value, defines a cacheable address or write protect memory address region in the memory address space. A base memory address register referred to as the BMA register defines the amount of user memory designated as cacheable available in the computer system C in the conventional one Mbyte address space. The BMA register works in conjunction with predefined memory address 000000H, which serves as the lower boundary defining the cacheable address region. In the preferred embodiment, the BMA register is programmed with memory address value 0A0000H, signifying that the entire user memory address space from address 000000H to 09FFFFH is defined as being cacheable. Comparator circuitry associated with the BMA register compares true or a logic low value for addresses generated by the computer system C that are less than the memory address stored in the BMA limit register and in the first one Mbyte of the address space.

A ROM memory address register referred to as the RMA register is used to define the amount of cacheable memory in the memory address region where the system ROM 42 and video ROM reside, and also to write protect this memory region. The RMA register works in conjunction with predefined memory address 100000H or one Mbyte, which serves as the upper boundary defining the cacheable address region. The RMA register is programmed with memory address 0E0000H according to the preferred embodiment, which signifies that the 128 kbyte memory address space between memory address 0E0000H and memory address 0FFFFFH, which is the entire system and video ROM memory area, is designated as a cacheable address and write protect region. Comparator circuitry associated with the RMA register compares true or a logic high value for addresses generated by the computer system C that are less than memory address 100000H and greater than or equal to the memory address value stored in the RMA limit register.

An extended memory address register referred to as the EMA register is used to define the amount of contiguous cacheable extended memory in the extended memory address space greater than or equal to memory address 100000H. The EMA register works in conjunction with predefined memory address 100000H, which serves as the lower boundary defining the cacheable address region, to define a cacheable memory address region greater than or equal to the predefined boundary address 100000H and less than the programmed memory address value stored in the register. The EMA register is programmed with memory address 200000H according to the preferred embodiment, which signifies that one Mbyte of extended memory between memory address 100000H and memory address 1FFFFFH is designated as cacheable memory. Comparator circuitry associated with the EMA register compares true for addresses generated by the computer system C that are greater than or equal to memory address 100000H and less than the memory address value stored in the EMA limit register.

A ROMCOPY address register referred to as the RCA register is used to define a cacheable memory address region between predefined memory address FFFFFFH and the programmed memory address value stored in the RCA register. The RCA register enables the copy of system ROM 42 and video ROM that is relocated to the upper 128 kbyte block in high speed RAM 23 to be designated as cacheable. In addition, a write protect address register referred to as the WPA register allows this ROMCOPY address region to be designated as write protected or effectively read only memory in the cache controller. The WPA register is used to define a write protect memory address region between predefined memory address FFFFFFH, the highest address available to the microprocessor of the preferred embodiment which serves as the upper boundary defining the cacheable address region, and the programmed memory address value stored in the WPA register. The WPA register is programmed with memory address FE0000H in the preferred embodiment, which signifies that the upper 128 kbyte memory block between memory address FE0000H and memory address FFFFFFH is designated as write protected inside the cache 30. The RCA register is programmed with memory address FA0000H in the preferred embodiment, which signifies that the upper 384 kbyte memory block between memory address FA0000H and memory address FFFFFFH is designated as cacheable inside the cache 30. However, different values may be used in the two registers. Comparator circuitry associated with each of the RCA and WPA registers compares true for addresses generated by the computer system C that are greater than or equal to the memory address value stored in the respective limit register.

Referring now to FIGS. 3 through 7, each of the respective limit registers and their associated comparator circuitry is generally shown. Each of the limit registers is programmed with a certain value comprised of a number of upper address bits representing a desired memory address value that serves as the memory address boundary in the respective limit register. The least significant address bit that can be programmed into each of the limit registers is PADR<13>, and because of this the address granularity of each of the limit registers is set at 8 kbyte increments. However, the use of larger registers to provide a smaller address granularity is also contemplated.

Figure 3:
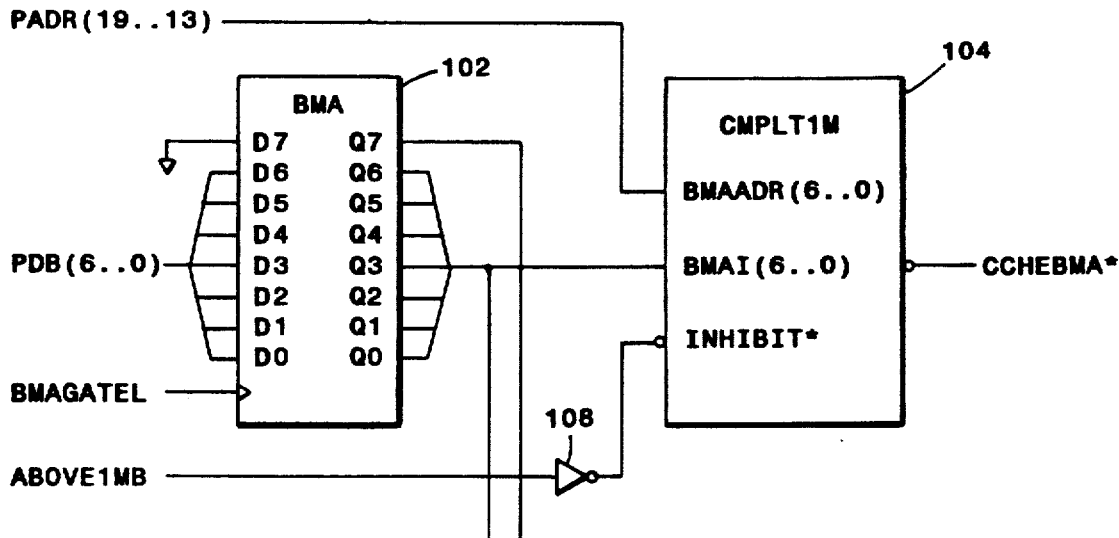
FIGS. 3–7 are schematic logic diagrams of the programmable limit registers and associated comparator circuitry according to the present invention.

Referring now to FIG. 3, the BMA register 102 and associated comparator logic circuitry are generally shown. The BMA register 102 is an 8 bit register whose D6 through D0 inputs are connected to the data bus lines PDB<6...0>, respectively. The D7 input of the BMA register 102 is connected to a logic low value. A gating signal referred to as BMAGATEL is connected to the gate input of the BMA register 102. The BMAGATEL signal is asserted high when a user is writing to or programming the BMA register 102. Since this type of port addressing circuitry is well known to those skilled in the art, the details of its implementation have been omitted in this description for the purpose of clarity. When the BMAGATEL signal is asserted high, the BMA register 102 latches the data bus signals PDB<6...0> on its D6 through D0 inputs, respectively.

The BMA register 102 is programmed with a 7 bit value representing address bits 19 through 13 of the respective memory address boundary desired in the limit register. The signals output from the Q7 through Q0 outputs of the BMA register 102 are referred to as the BMA<7...0> signals, and the BMA<6...0> signals are connected to inputs BMAI<6...0> of a block comparator circuit referred to as CMPLT1M 104. The address lines PADR<19...13> are connected to inputs BMAADR<6...0> of the CMPLT1M block circuit 104. A signal referred to as ABOVE1MB, which is asserted high when the memory address generated by the computer system C is greater than or equal to memory address 100000H (one Mbyte), is connected to the input of an inverter 108, whose output is connected to an INHIBIT* input of the CMPLT1M block circuit 104.

The CMPLT1M block circuit 104 compares the PADR<19...13> signals with the corresponding memory address values stored in the BMA register and determines if the memory address value generated by the computer system C is less than the BMA register value. The output of the CMPLT1M block circuit 104 is a signal referred to as CCHEBMA*, which is asserted low when the respective memory address value generated by the computer system C, represented by the PADR<19...13> signals, is less than the memory address value stored in the BMA register, signifying that the generated memory address is a cacheable address.

The ABOVE1MB signal is asserted high when the address generated on the address lines PADR<23...20> represent an address greater than or equal to one Mbyte. When the ABOVE1MB signal is asserted, the INHIBIT* signal is asserted inside the CMPLT1M block circuit 104, preventing the CCHEBMA* signal from being asserted low. Therefore, if the memory address generated by the computer system C is greater than or equal to one Mbyte, the ABOVE1MB signal acts to prevent the memory address from being designated as cacheable, regardless of the value stored in the BMA register and the states of the PADR<19...13> signals. Thus the ABOVE1MB signal performs the remaining decode function on the PADR<23 ... 20> signals not provided to the CMPLTIM block circuit 104 to save circuitry.

Figure 4:
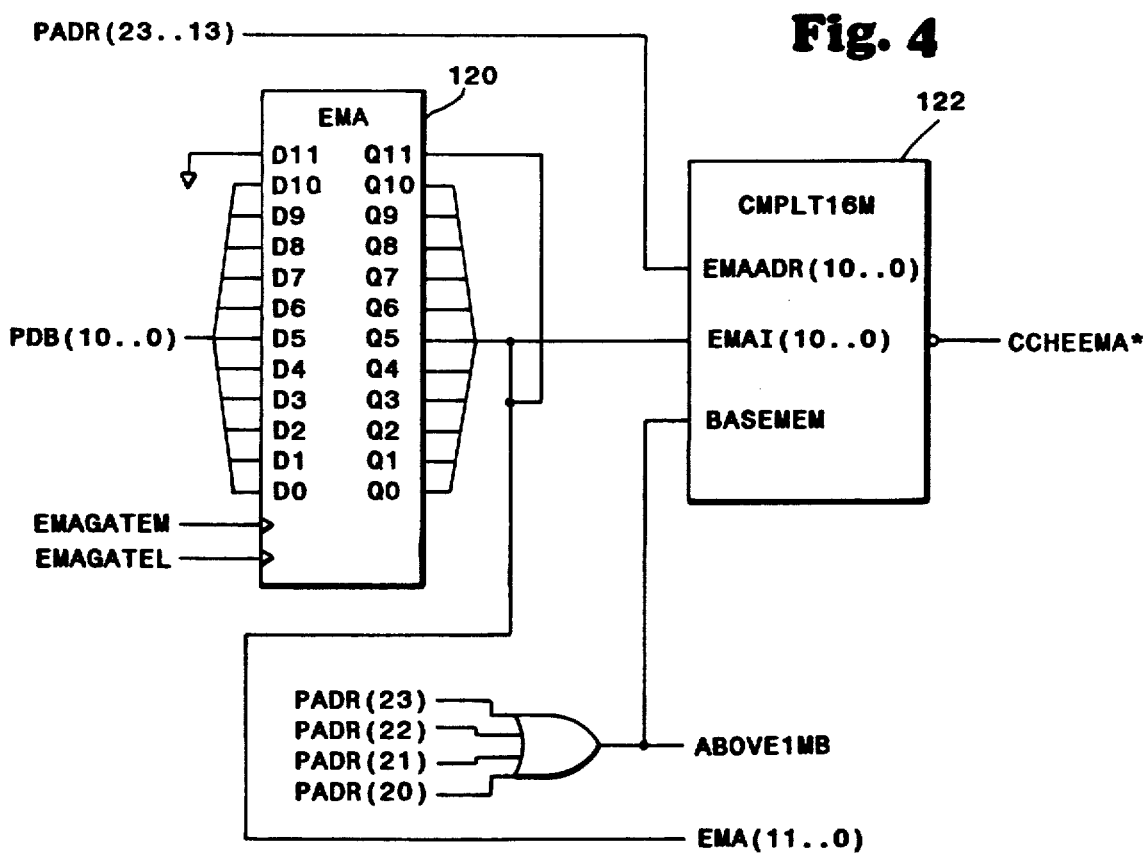

Referring now to FIG. 4, the EMA register 120 and its associated comparator logic circuitry are generally shown. The EMA register 120 is a 12 bit register whose D10 through D0 inputs are connected to the PDB<10 ... 0> signals, respectively. The D11 input of the EMA register 120 is connected to a logic low value. A gating signal referred to as EMAGATEL is connected to the lower gating input of the EMA register 120. A gating signal referred to EMAGATEM is connected to the upper gating input of the EMA register 120. When the EMAGATEL signal is asserted high, the EMA register 120 latches the PDB<7 ... 0> signals present on its D7 through D0 inputs, respectively. When the EMAGATEM signal is asserted high, the EMA register 120 latches the PDB<11 ... 8> signals present on its D11 through D8 inputs, respectively. The EMAGATEM and EMAGATEL signals are asserted high when a user is writing to or programming the respective bits of the EMA register 120.

The EMA register 120 is programmed with an 11 bit value representing address bits 23 through 13 of the respective memory address boundary desired in the limit register. The signals output from the Q11 through Q0 outputs of the EMA register 120 are referred to as the EMA<11 ... 0> signals, and the EMA<10 ... 0> signals are connected to inputs EMAI<10 ... 0> of a block comparator circuit referred to as CMPLT16M 122. The address lines PADR<23 ... 13> are connected to inputs EMAADR<10 ... 0> of the CMPLT16M block circuit 122. The PADR<23> signal, the PADR<22> signal, the PADR<21> signal, and the PADR<20> signal are connected to the inputs of a four input OR gate 126 whose output is the ABOVE1MB signal. The ABOVE1MB signal is connected to an enable input of the CMPLT16M block circuit 122 referred to as the BASEMEM input. When the ABOVE1MB signal is asserted high, then the memory address generated by the computer system C is greater than or equal to memory address 100000H, and the CMPLT16M block circuit 122 is enabled. Therefore, the ABOVE1MB signal acts as the predefined memory address boundary of one Mbyte, preventing the CMPLT16M block comparator 122 from comparing true when the generated memory address is less than one Mbyte.

The CMPLT16M block comparator 122 compares the PADR<23 ... 13> signals with the corresponding memory address values stored in the EMA register 120 and determines if the memory address value generated by the computer system C is less than the EMA register value. The CMPLT16M comparator circuit 122 has an inherent or default maximum value of 16 Mbytes, and the value stored in the EMA register can range as high as memory address FFFFFFH. The output of the CMPLT16M comparator circuit 122 is a signal referred to as CCHEEMA*, which signifies, when asserted low, that the memory address generated by the computer system C resides in the cacheable region defined by the predefined memory address value of one Mbyte and the EMA register 120.

Figure 5:
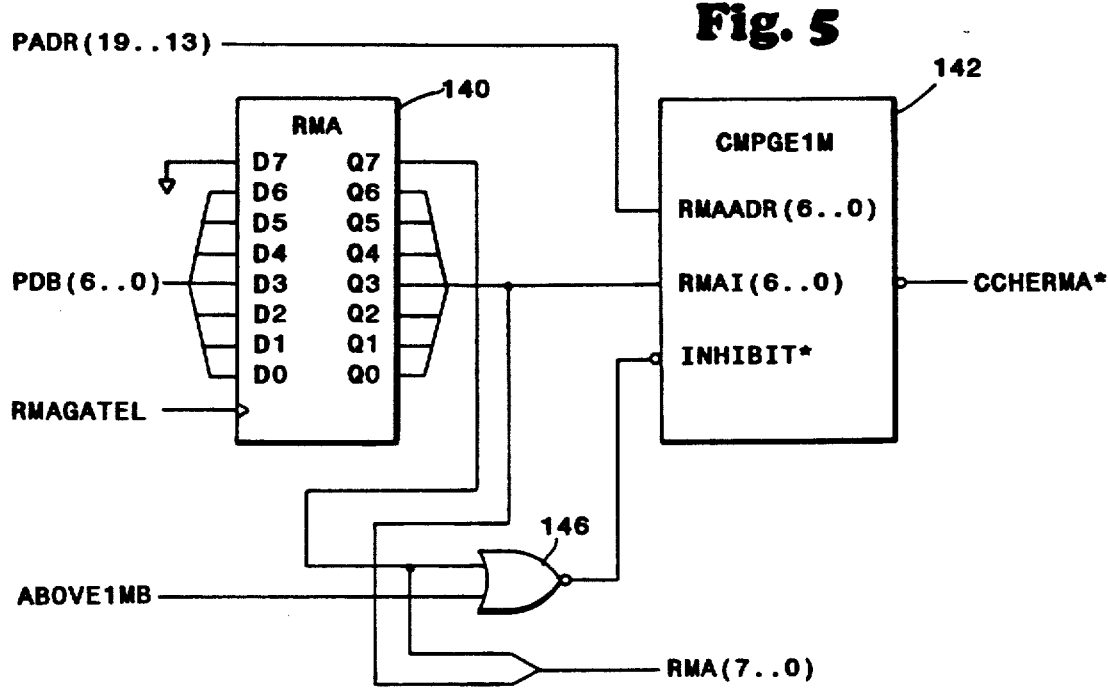

Referring now to FIG. 5, the RMA register 140 and its associated comparator circuitry are generally shown. The RMA register 140 is an 8 bit register whose D7 through D0 inputs are connected to the PDB<7 ... 0> signals, respectively. A gating signal referred to as RMAGATEL is connected to the gating input of the RMA register 140. The RMAGATEL signal is asserted high when a user is writing to or programming the RMA register. When the RMAGATEL signal is asserted high, the RMA register 140 latches the PDB<7 ... 0> signals on its D7 through D0 inputs, respectively.

The RMA register 140 is programmed with an 8 bit value, and the first seven bits D6 through D0 represent address bits 19 through 13 of the respective memory address boundary desired in the limit register. The D7 bit in the RMA register 140 is used as a control bit and it is set to a logic high value to disable the block comparator circuit referred to as CMPGE1M 142 from comparing true. The Q7 through Q0 outputs of the RMA register 140 are referred to as the RMA<7 ... 0> signals, respectively. The RMA<6 ... 0> signals are connected to inputs RMAI<6 ... 0> of the CMPGE1M comparator block circuit 142. The PADR<19 ... 13> signals are connected to inputs RMAADR<6 ... 0> of the CMPGE1M block comparator 142. The RMA<7> signal and the ABOVE1MB signal are connected to the inputs of a two input NOR gate 146 whose output is connected to an INHIBIT* input of the CMPGE1M comparator circuit 142. Therefore, when the D7 bit of the RMA register 140 is set or the memory address value generated by the computer system C is greater than or equal to memory address 100000H, then the INHIBIT* signal inside the CMPGE1M block comparator 142 is asserted low, which thereby prevents the CMPGE1M comparator circuit 142 from comparing true.

The output of the CMPGE1M comparator circuit 142 is a signal referred to as CCHERMA*. The CMPGE1M comparator circuit 142 compares the PADR<19 ... 13> signals with the corresponding memory address values stored in the RMA register 140 and asserts the CCHERMA* signal low if the memory address value generated by the computer system C is less than memory address 100000H and greater than or equal to the RMA register value. The assertion of the CCHERMA* signal signifies that the generated memory address is a cacheable address and a write protect address.

Figure 6:
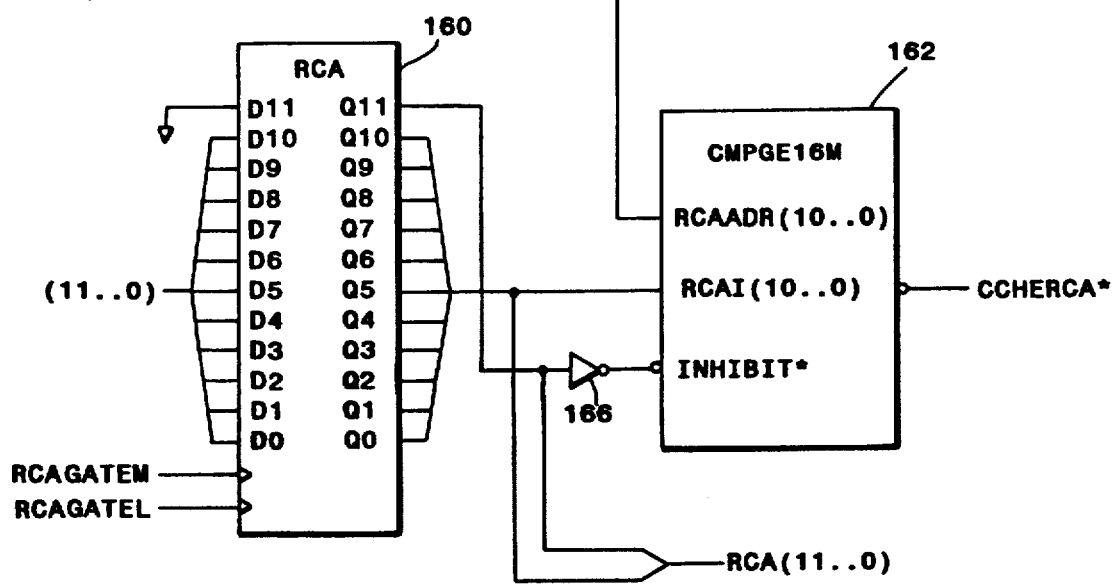

Referring now to FIG. 6, the RCA register 160 and associated comparator logic circuitry are generally shown. The RCA register 160 is a 12 bit register whose D11 through D0 inputs are connected to the PDB<11 ... 0> signals, respectively. A gating signal referred to as RCAGATEL is connected to the lower gating input of the RCA register 160. A gating signal referred to as RCAGATEM is connected to the upper gating input of the RCA register at 160. The RCAGATEL signal controls the lower eight inputs D7 through D0 of the RCA register 160. When the RCAGATEL signal is asserted high, the RCA register 160 latches the PDB<7 ... 0> signals present on its D7 through D0 inputs, respectively. The RCAGATEM signal controls the upper four inputs D11 through D8 of the RCA register 160. When the RCAGATEM signal is asserted high, the RCA register 160 latches the PDB<11 ... 8> signals present on the D11 through D8 inputs of the RCA register 160. The RCAGATEL and RCAGATEM signals are asserted high when a user is writing to or programming the appropriate bits in the RCA register 160.

The RCA register 160 is programmed with a 12 bit value, and the first eleven bits D11 through D0 represent address bits 23 through 13 of the respective memory address boundary desired in the limit register. The D11 bit in the RCA register 160 is used as a control bit and it is set to a logic high value to disable the block comparator referred to as the CMPGE16M block comparator 162 from comparing true. The Q11 through Q0 outputs of the RCA register 160 are referred to as the RCA<11...0> signals. The RCA<10...0> signals are connected to inputs RCAI<10 . . . 0> of the CMPGE16M block comparator 162. The PADR<23 . . . 13> signals are connected to inputs RCAADR<10 . . . 0> of the CMPGE16M block comparator 162. The RCA<11> signal of the RCA register 160 is connected to the input of an inverter 166 whose output is connected to an INHIBIT* input of the CMPGE16M comparator 162. The output of the CMPGE16M comparator 162 is a signal referred to as CCHERCA*.

The CMPGE16M block comparator 162 compares the PADR<23...13> signals with the corresponding memory address values stored in the RCA register 160 and determines if the memory address value generated by the computer system C is greater than or equal to the programmed value stored in the RCA register 160. The CCHERCA* signal is asserted low when the memory address generated by the computer system C is greater than or equal to the RCA register value, signifying that the generated memory address is a cacheable address.

Figure 7:
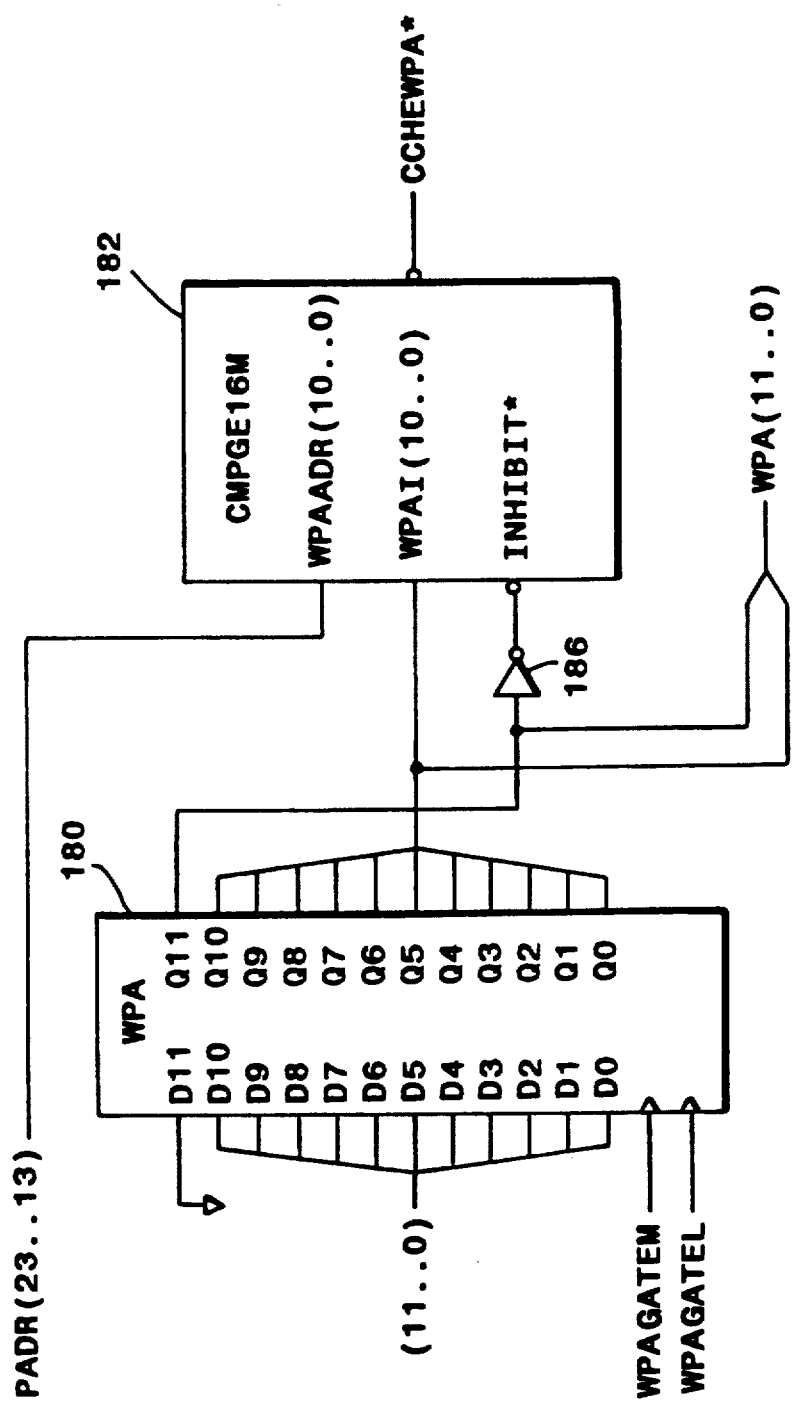

Referring now to FIG. 7, the WPA register 180 and its associated comparator circuitry are generally shown. The WPA register 180 is a 12 bit register whose D11 through D0 inputs are connected to the PDB<11 . . . 0> signals, respectively. A gating signal referred to as WPAGATEL is connected to the lower gating input of the WPA register 180. A gating signal referred to as WPAGATEM is connected to the upper gating input of the WPA register 180. The WPAGATEL signal controls the lower eight inputs D7 through D0 of the WPA register 180. When the WPAGATEL signal is asserted high, the WPA register 180 latches the PDB<7...0> signals present on its D7 through D0 inputs, respectively. The WPAGATEM signal controls the upper four inputs D11 through D8 of the WPA register 180. When the WPAGATEM signal is asserted high, the WPA register 180 latches the PDB<11 . . . 8> signals present on its D11 through D8 inputs, respectively. The WPAGATEL and WPAGATEM signals are asserted high when a user is writing to or programming the appropriate bits in the WPA register 180.

The WPA register 180 is programmed with a 12 bit value, and the first eleven bits connected to inputs D10 through D0 represent address bits 23 through 13 of the respective memory address boundary desired in the register 180. The D11 bit in the WPA register 180 is used as a control bit and it is set to a logic high value to disable the block comparator 182 from comparing true. The Q11 through Q0 outputs of WPA register 180 are referred to as the WPA<11 . . . 0> signals. The WPA<10 . . . 0> signals are connected to inputs WPAI<10 . . . 0> of the block comparator circuit referred to as CMPGE16M 182. The PADR<23 . . . 13> signals are connected to inputs WPAADR<10 . . . 0> of the CMPGE16M block comparator 182. The WPA<11> signal is connected to the input of an inverter 186 whose output is connected to the INHIBIT input of the CMPGE16M block comparator 182. The output of the CMPGE16M block comparator 182 is a signal referred to as CCHEWPA*.

The CMPGE16M block comparator 182 is logically identical to the CMPGE16M block comparator 162 of FIG. 6. The CMPGE16M block comparator 182 compares the PADR<23 . . . 13> signals with the corresponding memory address values programmed in the WPA register 180 and determines if the memory address value generated by the computer system C is greater than or equal to the value stored in the WPA register 180. The CCHEWPA* signal is asserted low when the memory address generated by the computer system C is greater than or equal to the WPA register value, signifying that the generated memory address is a write protected address.

The computer system C preferably includes an I/O-mapped relocation register (not shown) residing at I/O location 0878H which is used to store information regarding relocation of the ROM to high-speed RAM. The relocation register may also be a memory mapped register residing at memory location 80C00000H according to another embodiment. The relocation register comprises two bits referred to as bit 0 and bit 1. Bit 0 is set to a logic high value when the ROM relocation is not performed and is cleared to a logic low value when the ROM relocation is performed to high-speed RAM. Bit 1 is set to a logic high value when the 128 kbyte RAM memory block beginning at memory address FE0000H is not write protected and is cleared to a logic low value when the 128 kbyte RAM memory block beginning at memory address FE0000H is designated as write protected. For more information on the ROM relocation register, please refer to the Compaq Deskpro 386S Technical Reference Guide published by Compaq Computer Corporation, which is hereby incorporated by reference.

The cache controller 32 according to the present invention includes a user programmable control word register (not shown) referred to as the CW register. The CW register includes an internal register enable bit referred to as the IRE bit. The IRE bit enables the comparator output signals to define cacheable address and write protect regions in the memory space according to the present invention. When the IRE bit is cleared, the comparator output signals are ignored, and the entire memory address space is considered cacheable and read/write memory. The NRF* input is then used in conjunction with the external logic 34 to determine non-cacheable and write protect regions in the memory space. When the IRE bit is set, the entire memory address space is considered non-cacheable and the comparator output signals are enabled to define cacheable and write protect memory address regions in the non-cacheable memory address space. In this instance, the NRF* input allows the external logic 34 to override a respective limit register and punch non-cacheable or write protect memory address regions in the memory space where desired. According to the preferred embodiment, the IRE bit is kept set and the external logic 34 is comprised of an address decode of memory address FFFF80H and above and generates a decoded address signal that is provided to the NRF* input to designate as non-cacheable the memory address locations FFFF80H and above in high memory where the power on reset vector is addressed. However, the use of the NRF* input to designate other memory locations as non-cacheable and/or write protected is also contemplated.

Figure 8:
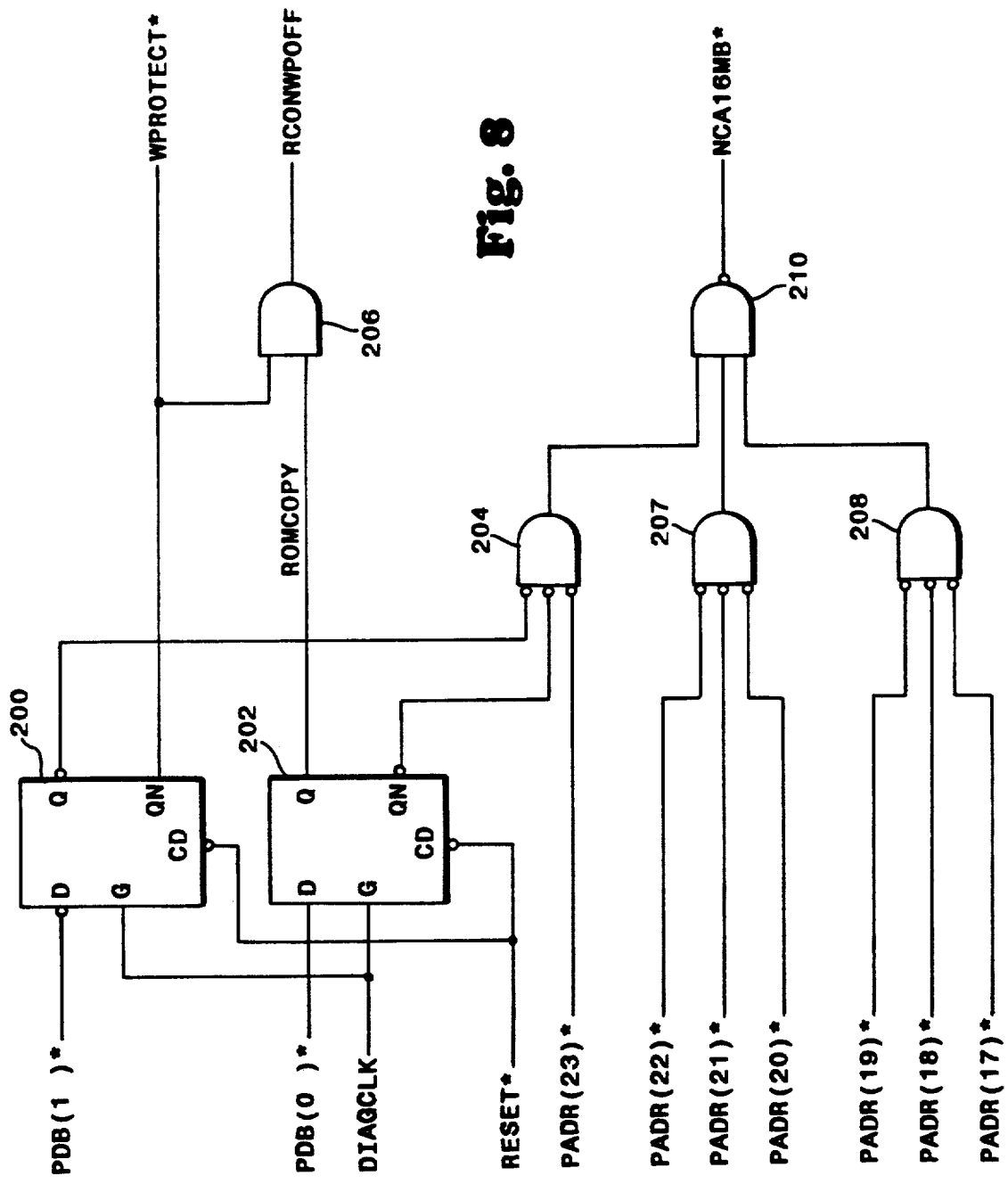
FIGS. 8 and 9 are schematic logic diagrams of signal generation circuitry according to the present invention.

Referring now to FIG. 8, the signal generation logic according to the present invention includes a shadow register which holds a shadow copy of bit 0 and bit 1 of the memory-mapped relocation register. The shadow register enables the signal generation logic to know when the ROM relocation to high memory has been performed and also to know whether the 128 kbyte block beginning at memory address FE0000H where the ROM relocation occurs is write protected.

The shadow register is comprised of two D-type latches 200 and 202, respectively. The PDB<1>* signal is connected to the inverted D input of the latch 200. The PDB<0>* signal is connected to the input of the latch 202. A gating signal referred to as DIAGCLK is connected to the gating inputs of each of the latches 200 and 202. The DIAGCLK signal is asserted or a logic high value when a user is writing to the shadow register, allowing the latches 200 and 202 to latch the respective data bus values present on their D inputs. The system reset signal RESET* is connected to the inverted clear inputs of each of the latches 200 and 202 so that they are reset when a system reset occurs. The inverted Q output of the latch 200 is connected to one input of a three input NOR gate 204. The Q output of the latch 200 is a write protect signal referred to as WPROTECT*, which preferably mirrors or shadows bit 1 in the memory-mapped ROM relocation register (not shown). The WPROTECT* signal is connected to one input of a two input AND gate 206. The Q output of the latch 202 is a signal referred to as ROMCOPY, which is asserted high when the ROMCOPY function is on and bit 0 in the ROM relocation register is a logic low value. The ROMCOPY signal is connected to the other input of the AND gate 206. The output of the AND gate 206 is a signal referred to as RCONWPOFF which signifies when asserted high that the ROM relocation has been performed and that the Write Protect function is off.

The inverted Q output of the latch 202 is connected to an input of the NOR gate 204. The PADR<23>* signal is connected to an input of the NOR gate 204, whose output is connected to an input of a three input NAND gate 210. The PADR<22>* signal, the PADR<21>* signal, and the PADR<20>* signal are each connected to an input of a three input NOR gate 207 whose output is connected to one input of the NAND gate 210. The PADR<19>* signal, the PADR<1-8>* signal and the PADR<17>* signal are each connected to an input of a three input NOR gate 208, whose output is connected to an input of the NAND gate 210. The output of the NAND gate 210 is a non-cacheable address signal referred to as NCA16MB*, which is asserted low when the memory address generated by the computer system C is greater than memory address FE0000H, the ROMCOPY function is on and the Write Protect function is off. The NCA16MB* signal is generated to decode a special condition where cache coherency problems could occur in the 128 kbyte ROM relocation memory block in high memory, as is described further below.

Figure 9:
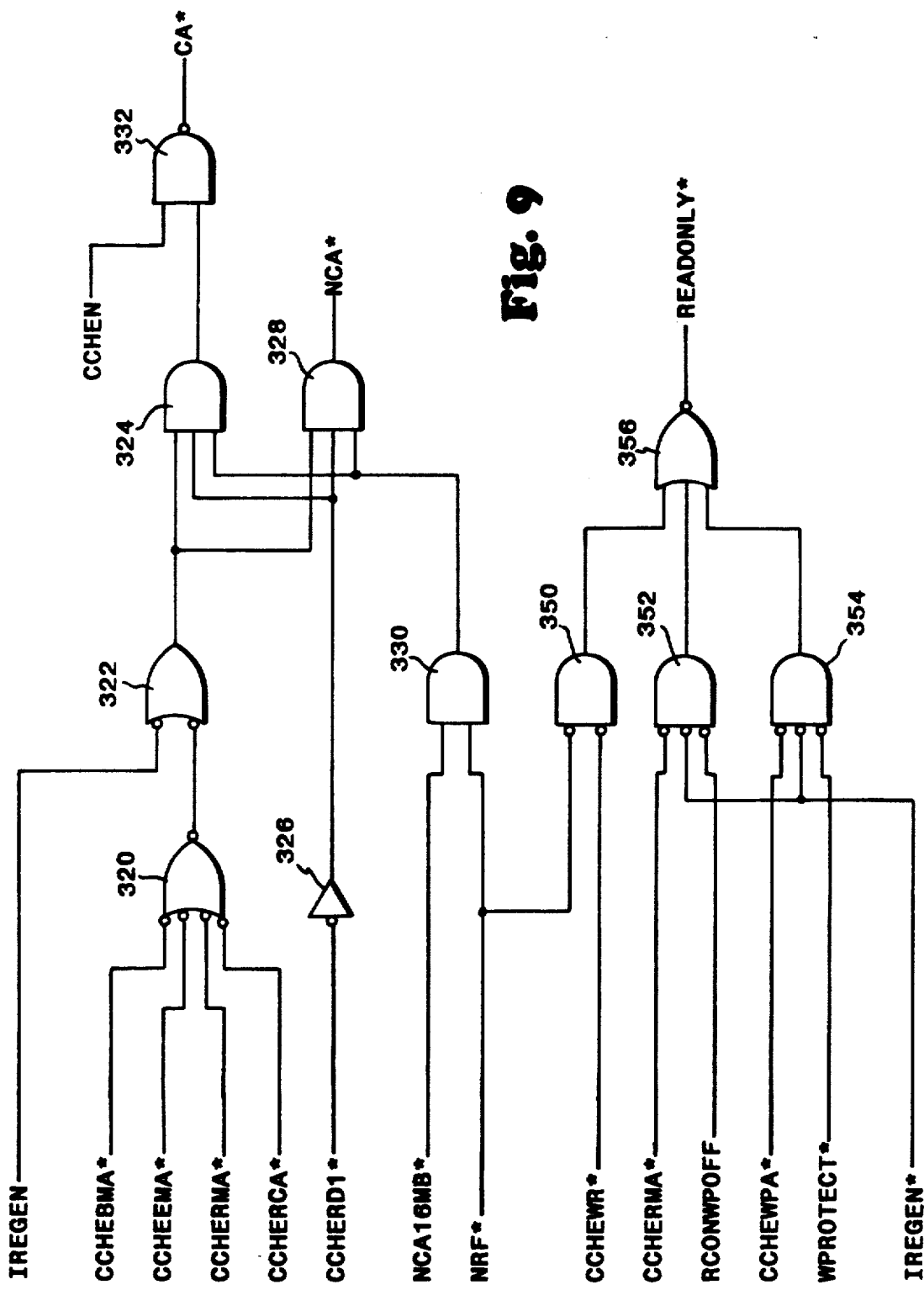

Referring now to FIG. 9, signal generation logic according to the present invention is further shown. The CCHEBMA* signal, the CCHEEMA* signal, the CCHERMA* signal, and the CCHERCA* signal are connected to the inputs of a four input AND gate 320. The output of the AND gate 320 and a signal generated from the IRE bit in the CW register (not shown) referred to as the IREGEN signal are connected to the inputs of a two input NAND gate 322. The output of the NAND gate 322 is connected to an input of a three input AND gate 324 and is also connected to an input of a three input AND gate 328. A signal referred to as CCHERD1*, which when asserted low signifies that the current bus cycle is a memory read, is connected to the input of an inverter 326, whose output is connected to an input of the AND gate 324 and is also connected to an input of the AND gate 328. The signal generated from the external logic 34 represents decoded memory address FFFF80H or above, and this signal is provided to the NRF* input and is referred to as the NRF* signal. The NCA16MB* signal and the NRF* signal are connected to the inputs of a two input AND gate 330, whose output is connected to an input of the AND gate 324 and is also connected to an input of the AND gate 328.

The output of the AND gate 324 and a cache memory enable signal referred to as CCHEN are connected to the inputs of a two input NAND gate 332, whose output is a cacheable address signal referred to as CA*. The CA* signal is asserted low to the cache controller 32 when a cacheable memory address is generated by the processor 24. Therefore, if the cache 30 is enabled, the comparator output signals are ignored based on the IREGEN signal being high or the comparator outputs are enabled and one of the comparator output signals is asserted, the current bus cycle is a processor memory read, and the NCA16MB* and NRF* signals are both negated high, then the logic circuitry determines that a cacheable memory address has been generated and the CA* signal is asserted low.

The output of the AND gate 328 is a non-cacheable address signal referred to as NCA*. The NCA* signal is asserted low when the generated memory address is deemed a non-cacheable address. Therefore, if the comparator outputs are enabled and all of the comparator output signals are negated, or the current bus cycle is not a processor memory read, or either of the NCA16MB* or NRF* signals are asserted low, then the logic circuitry determines that a non-cacheable address has been generated by the processor 24, and the NCA* signal is asserted low.

The NRF* signal allows external logic to override a respective comparator output signal and designate a certain memory address non-cacheable. The NRF* input is used in conjunction with the external logic 34 according to the preferred embodiment to make the power on reset vector memory location in high memory non-cacheable. When the IRE bit is cleared, signified by the IREGEN signal being negated low, the NRF* input is the only means to designate a memory address non-cacheable or write protected.

The NCA16MB* signal is asserted low to force the 128 kbyte ROM relocation block beginning at address FE0000H to become non-cacheable when the memory address generated resides in this memory block and both the ROMCOPY function has been performed and the Write Protect function is off. This is because, when the ROM relocation function has been performed, the 128 kbyte ROM relocation block is double mapped to two different 128 kbyte logical address spaces, one beginning at memory address FE0000H and one beginning at memory address 0E0000H. In this instance, the RMA register 140 and the RCA register 160 each define cacheable address regions for a respective logical memory address space that each map to the same physical memory location, the 128 kbyte ROM relocation RAM memory block in high memory. The RMA register 140 defines the memory space beginning at memory address 0E0000H to be a cacheable address region. When the Write Protect function is off, this memory address region is not write protected, and therefore write updates are permitted when a user accesses the 128 kbyte ROM relocation RAM memory block with a logical address in the 128 kbyte logical address space beginning at address 0E0000H. The 128 kbyte RAM memory block is generally accessed exclusively through the logical memory address space beginning at memory address 0E0000H. However, the NCA16MB* signal is asserted low in this instance to force the logical address space beginning at address FE0000H non-cacheable in order to prevent the 128 kbyte ROM relocation RAM memory space from being placed in the cache through the logical address space beginning at memory address FE0000H. However, a noncoherent condition could still be forced if the 128 kbyte ROM relocation RAM memory block were updated through the non-cacheable address space beginning at memory address FE0000H.

The NRF* signal and a cache write signal referred to as CCHEWR* are connected to the inputs of a two input NOR gate 350. The CCHERMA* signal, the IREGEN* signal and the RCONWPOFF signal are connected to the inputs of a three input NOR gate 352. The CCHEWPA* signal, the IREGEN* signal, and the WPROTECT* signal are connected to the inputs of a three input NOR gate 354. The outputs of the NOR gates 350, 352, and 354 are connected to the inputs of a three input NOR gate 356 whose output is a signal referred to as READONLY*. The READONLY* signal is asserted low to the cache controller 32 when a memory address write is designated as write protected because of either the external logic 34 connected to the NRF* input, because the write was to the RMA register memory space, which is designated write protected by the RMA register 140, and the Write Protect function is on, or because the memory address resides in the address space designated write protected by the WPA register 182. One should note that the CCHEWPA* signal is only enabled to generate the READONLY* signal when the Write Protect bit in the ROM relocation register is asserted low, signifying that the output of the CMPGE16M comparator 182 is only enabled when the 128 kbyte RAM memory block where the ROM relocation occurs is designated as write protected.

Therefore, the present invention allows a cache controller to determine cacheable address and write protect memory address regions using a single limit register and a single comparator for each address region. This reduces the gate count and decreases the input buffer loading in the logic circuitry.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An apparatus for determining if a memory address value developed in a computer system is within a plurality of memory address regions, the computer system including a microprocessor, system memory, and a system memory address space comprising a predefined intermediate memory address value, the apparatus comprising:

means for generating a signal which indicates whether said developed memory address value is greater than the intermediate memory address value;

a first storing means for storing a first memory address value which serves as a first boundary of a first memory address region;

a second storing means for storing a second memory address value which serves as a first boundary of a second memory address region;

a third storing means for storing a third memory address value which serves as a first boundary of a third memory address region;

a first comparing means coupled to said first storing means for comparing said developed memory address value with said first memory address value, wherein said first comparing means only determines whether said developed memory address value is less than the memory address value stored in said first storing means and generates a first signal indicative thereof, said first indicating signal indicating that said developed memory address value resides in said first memory address region based only on whether said developed memory address value is less than said first memory address value stored in said first storing means;

a second comparing means coupled to said second storing means for comparing said developed memory address value with said second memory address value, wherein said second comparing means only determines whether said developed memory address value is greater than or equal to said second memory address value stored in said second storing means and generates a second signal indicative thereof, said second indicating signal indicating that said developed memory address value resides in said second memory address region based only on whether said developed memory address value is greater than or equal to said second memory address value stored in said second storing means; and a third comparing means coupled to said third storing means for receiving said intermediate address indicating signal and for comparing said developed memory address value with said third memory address value, wherein said third comparing means determined whether said developed memory address value resides between the memory address value stored in said third storing means and the intermediate memory address value using only the third memory address value stored in said third storing means and said intermediate address indicating signal and generates a third signal indicative thereof, said third indicating signal indicating that said developed memory address value resides in said third memory address region if said developed memory address value resides between the memory address value stored in said third storing means and the intermediate memory address value.

2. The apparatus of claim 1, wherein said third storing means stores a memory address value greater than said intermediate memory address value.

3. The apparatus of claim 1, wherein each of said memory address regions has associated with it only one said memory address value storing means storing only one memory address value and only one said comparing means performing only one memory address value comparison.

4. The apparatus of claim 3, wherein said system memory address space comprises a lowest memory address and a highest memory address, the apparatus further comprising:

the first memory address region associated with said first storing means being located between said first memory address value stored in said first storing means and said lowest memory address; and the second memory address region associated with said second storing means being located between said second memory address value stored in said second storing means and said highest memory address.

5. The apparatus of claim 3, wherein said computer system further includes cache memory and a cache controller, wherein one of said memory address regions is designated as a cacheable memory address region such that said indicating signal generated by said comparing means associated with said memory address region designated as said cacheable memory address region indicates that said developed memory address value resides in said cacheable memory address region; the apparatus further comprising:

means coupled to said cache controller for receiving said indicating signal from said comparing means associated with said memory address region designated as said cacheable memory address region and for generating a cacheable address signal to said cache controller which indicates whether said developed memory address value is located in said cacheable memory address region.

6. The apparatus of claim 5, wherein one of said memory address regions is designated as a write protect memory address region such that said indicating signal generated by said comparing means associated with said memory address region designated as said write protect memory address region indicates that said developed memory address value resides in said write protect memory address region; the apparatus further comprising:

indicating signal receiving means for receiving said indicating signal from said comparing means associated with said memory address region designated as said write protect memory address region and for generating a write protect signal to said cache controller which indicates whether said developed address is located in said write protect memory address region.

7. The apparatus of claim 5, further comprising an enabling bit, wherein when said enabling bit is cleared the system memory space is deemed cacheable and said indicating signal from said comparing means associated with said cacheable memory address region is ignored and when said enabling bit is set the system memory space, subject to exceptions provided by said indicating signal from said comparing means associated with sand cacheable memory address region, is deem non-cacheable, and said indicating signal from said comparing means associated with said cacheable memory address regions is enabled to designate cacheable address region in the system memory space.

8. The apparatus of claim 5, further comprising:

said receiving means further comprising an input for receiving a signal generated by external logic, wherein said external logic signal can force said cacheable address signal to indicate that a generated memory address value is a cacheable or non-cacheable address.

9. The apparatus of claim 1, wherein said first, second, and third storing means are programmable.

10. The apparatus of claim 9, wherein each of said memory address boundary value storing means stores a number of address bits representing a memory address value.

11. The apparatus of claim 1, wherein said third storing means stores a memory address value less than said intermediate memory address value.

12. An apparatus for determining if a memory address value developed in a computer system is within any of a plurality of memory address regions, the computer system having a given address space, the address space being divided into regions based on the beginning of the address space and a memory address value intermediate in the address space, the apparatus comprising:

means for performing an address decode of said developed memory address value to determine if said developed memory address value is greater than the intermediate memory address value and for producing an intermediate address decode signal indicative thereof;

a first storing means for storing a first memory address value associated with a first memory address region at the beginning of the address space;

a second storing means for storing a second memory address value associated with a second memory address region having one boundary at the intermediate memory address value;

a third storing means for storing a third memory address value associated with a third memory address region having one boundary at the intermediate memory address value;

a first comparing means for comparing the developed memory address with said first memory address value stored in said first storing means and determining if said developed memory address value is less than said stored first memory address value, said first comparing means generating a signal indicating whether the developed memory address value resides in said first address region based only on said comparison of the developed memory address value with said first memory address value stored in said first storing means;

a second comparing means for receiving said intermediate address decode signal and for comparing the developed memory address value with said second memory address value stored in said second storing means and for determining if said developed memory value is greater than said stored second memory address value and producing a second signal indicative thereof and for defeating operation of said determining if said intermediate address decode signal indicates that said developed memory address value is greater than said second memory address value, said second indicating signal indicating whether the developed memory address value resides in said second address region based only on said comparison of the developed memory address value with said second memory address value stored in said second storing means and said intermediate address decode signal; and a third comparing means for receiving said intermediate address decode signal and for comparing the developed memory address value with said third memory address value stored in said third storing means and for determining if said developed memory address value is less than said stored third memory address value and producing a signal indicative thereof and for defeating operation of said determining if said intermediate address decode signal indicates that said developed memory address value is not greater than the intermediate address value, said third indicating signal indicating whether the developed memory address value resides in said third address region based only on said comparison of the developed memory address value with said third memory address value stored in said third storing means and said intermediate address decode signal.

13. The apparatus of claim 12, the computer system address space having a further division based on the end of the address space, the apparatus further comprising:
- a fourth storing means for storing a fourth memory address value associated with the end of the address space; and
- a fourth comparing means for comparing the developed memory address value with said fourth memory address value stored in said fourth storing means and for determining if said developed memory address value is greater than said stored fourth memory address value, said fourth comparing means generating a signal indicating whether the developed memory address value resides in said fourth address region based only on said comparison of the developed memory address value with said fourth memory address value stored in said fourth storing means.

* * * * *

UNITED STATES PATENT AND TRADEMARK OFFICE
CERTIFICATE OF CORRECTION

PATENT NO. : 5,210,850

DATED : May 11, 1993

INVENTOR(S) : Philip C. Kelly, et al.

It is certified that error appears in the above-identified patent and that said Letters Patent is hereby corrected as shown below:

In col. 19, line 60, please replace "sand" with --said--.

In col. 19, line 61, please replace "deem" with --deemed--.

In col. 19, line 64, please replace "regions" with --region--.

In col. 19, line 64, please replace "region" with --regions--.

Signed and Sealed this

Fourth Day of January, 1994

Attest:

BRUCE LEHMAN

Attesting Officer    Commissioner of Patents and Trademarks